(12) United States Patent
Cumeralto

(10) Patent No.: US 9,420,515 B2
(45) Date of Patent: Aug. 16, 2016

(54) ENDPOINT REPEATER FUNCTIONALITY SELECTION

(75) Inventor: Scott Cumeralto, Spokane, WA (US)

(73) Assignee: Itron, Inc., Liberty Lake, WA (US)

( * ) Notice: Subject to any disclaimer, the term of this patent is extended or adjusted under 35 U.S.C. 154(b) by 676 days.

(21) Appl. No.: 13/275,863

(22) Filed: Oct. 18, 2011

(65) Prior Publication Data

US 2013/0093600 A1    Apr. 18, 2013

(51) Int. Cl.
| | |
|---|---|
| *G08C 19/16* | (2006.01) |
| *H04W 40/10* | (2009.01) |
| *H04B 3/36* | (2006.01) |
| *H04W 40/24* | (2009.01) |
| *H04L 12/26* | (2006.01) |

(52) U.S. Cl.
CPC ............. *H04W 40/10* (2013.01); *H04B 3/36* (2013.01); *H04L 43/0817* (2013.01); *H04W 40/24* (2013.01)

(58) Field of Classification Search
CPC ........................................................ H04B 3/36
USPC .................................................. 340/870.01
See application file for complete search history.

(56) References Cited

U.S. PATENT DOCUMENTS

| | | | |
|---|---|---|---|
| 3,942,168 A | 3/1976 | Whyte | |
| 4,803,632 A | 2/1989 | Frew et al. | |
| 5,519,387 A | 5/1996 | Besier et al. | |
| 5,574,724 A * | 11/1996 | Bales | H04Q 11/0428 370/410 |
| 5,659,300 A | 8/1997 | Dresselhuys et al. | |
| 5,675,583 A * | 10/1997 | Bales | H04L 12/1822 370/261 |
| 5,701,295 A * | 12/1997 | Bales | H04Q 11/0428 370/271 |
| 5,729,532 A * | 3/1998 | Bales | H04L 29/06 370/261 |
| 5,825,303 A | 10/1998 | Bloss, Jr. et al. | |
| 5,874,903 A | 2/1999 | Shuey et al. | |
| 5,978,371 A | 11/1999 | Mason, Jr. et al. | |
| 6,067,052 A | 5/2000 | Rawles et al. | |
| 6,137,423 A | 10/2000 | Glorioso et al. | |
| 6,181,257 B1 | 1/2001 | Meek et al. | |
| 6,181,294 B1 | 1/2001 | Porter et al. | |
| 6,218,995 B1 | 4/2001 | Higgins et al. | |
| 6,262,685 B1 | 7/2001 | Welch et al. | |
| 6,304,227 B1 | 10/2001 | Hill et al. | |
| 6,373,442 B1 | 4/2002 | Thomas et al. | |
| 6,378,817 B1 | 4/2002 | Bublitz et al. | |

(Continued)

FOREIGN PATENT DOCUMENTS

| | | |
|---|---|---|
| JP | 2005323266 | 11/2005 |
| JP | 2008108170 | 5/2008 |

(Continued)

OTHER PUBLICATIONS

Office Action for Canadian Patent Application No. 2,755,450 dated Feb. 28, 2012.

(Continued)

*Primary Examiner* — Amine Benlagsir

(57) ABSTRACT

Disclosed are apparatus and methodology for improving communications among battery operated network endpoints and a central facility. A battery operated endpoint may determine its remaining battery capacity and decide whether it is able to provide message repeating services to other endpoints within the network. The endpoint may make such decision based also on its own communications reliability to a central facility either directly or via other endpoints operating as repeaters.

15 Claims, 3 Drawing Sheets

(56) References Cited

U.S. PATENT DOCUMENTS

| | | | |
|---|---|---|---|
| 6,568,645 B2 | 5/2003 | Maddox | |
| 6,606,065 B1 | 8/2003 | Payne et al. | |
| 6,606,070 B2 | 8/2003 | Olson et al. | |
| 6,617,976 B2 | 9/2003 | Walden et al. | |
| 6,737,985 B1 | 5/2004 | Garrard et al. | |
| 6,778,099 B1 | 8/2004 | Meyer et al. | |
| 6,903,699 B2 | 6/2005 | Porter et al. | |
| 7,098,773 B2 | 8/2006 | Berkman | |
| 7,554,932 B1* | 6/2009 | Shurmantine | H04B 7/155 370/279 |
| 7,554,941 B2* | 6/2009 | Ratiu | G01D 21/00 370/231 |
| 8,024,724 B2 | 9/2011 | Garrison Stuber et al. | |
| 8,370,907 B1* | 2/2013 | Potter | G06F 11/3006 455/404.1 |
| 2003/0179149 A1 | 9/2003 | Savage et al. | |
| 2005/0135379 A1* | 6/2005 | Callaway, Jr. | H04L 45/48 370/395.31 |
| 2006/0038700 A1* | 2/2006 | Cumeralto | G01D 4/002 340/870.02 |
| 2006/0056363 A1* | 3/2006 | Ratiu | G01D 21/00 370/338 |
| 2006/0056370 A1* | 3/2006 | Hancock | H04B 7/2606 370/338 |
| 2006/0253735 A1* | 11/2006 | Kwak | G06F 1/3203 714/12 |
| 2007/0161352 A1* | 7/2007 | Dobrowski | H04L 41/00 455/69 |
| 2008/0075028 A1 | 3/2008 | Park et al. | |

FOREIGN PATENT DOCUMENTS

| | | |
|---|---|---|
| JP | 2011109338 | 6/2011 |
| JP | 2013030871 | 2/2013 |
| JP | 2013207762 | 10/2013 |
| WO | 2010/100014 A1 | 9/2010 |

OTHER PUBLICATIONS

Office Action for Canadian Patent Application No. 2,755,450 dated Jul. 13, 2012.

PCT International Search Report for PCT International Application No. PCT/US2011/062810, search completed Feb. 7, 2012; report mailed Feb. 22, 2012.

Written Opinion of the International Searching Authority for PCT International Application No. PCT/US2011/062810, opinion completed Feb. 10, 2012; date of mailing Feb. 7, 2012.

The Canadian Office Action mailed Apr. 18, 2013 for Canadian patent application No. 2755450, a counterpart foreign application of U.S. Appl. No. 13/275,863, 3 pages.

Translated copy of the Japanese Office Action mailed Sep. 9, 2014 for Japanese patent application No. 2014-537053, a counterpart foreign application of U.S. Appl. No. 13/275,863, 11 pages.

The Australian Office Action mailed Dec. 4, 2014 for Australian patent application No. 2011379366, a counterpart foreign application of U.S. Appl. No. 13/275,863, 3 pages.

Final Office Action for U.S. Appl. No. 13/275,863, mailed on Nov. 6, 2014, Scott Cumeralto, "Endpoint Repeater Functionality Selection", 24 pages.

Kentaro Ota et al., "Improvement of the Node Activity Rate by Introduction of New Inactive Node Reactivation Condition in Solar-Powered Wireless Sensor Networks", IEICE Technical Report, IEICE, Japan, Jan. 2011, USN2010-63 (Jan. 2011), pp. 137-142, with English Abstract.

Japanese Notice of Allowance, mailed Mar. 8, 2016, with English translation, Japanese Patent Application No. 2015-064873, 6 pages.

Japanese Office Action mailed Nov. 17, 2015, along with English translation, for Japanese Patent Application No. 2015-064873, 9 pages.

The Extended European Search Report mailed Oct. 12, 2015 for European patent application No. 11874130.5, 7 pages.

* cited by examiner

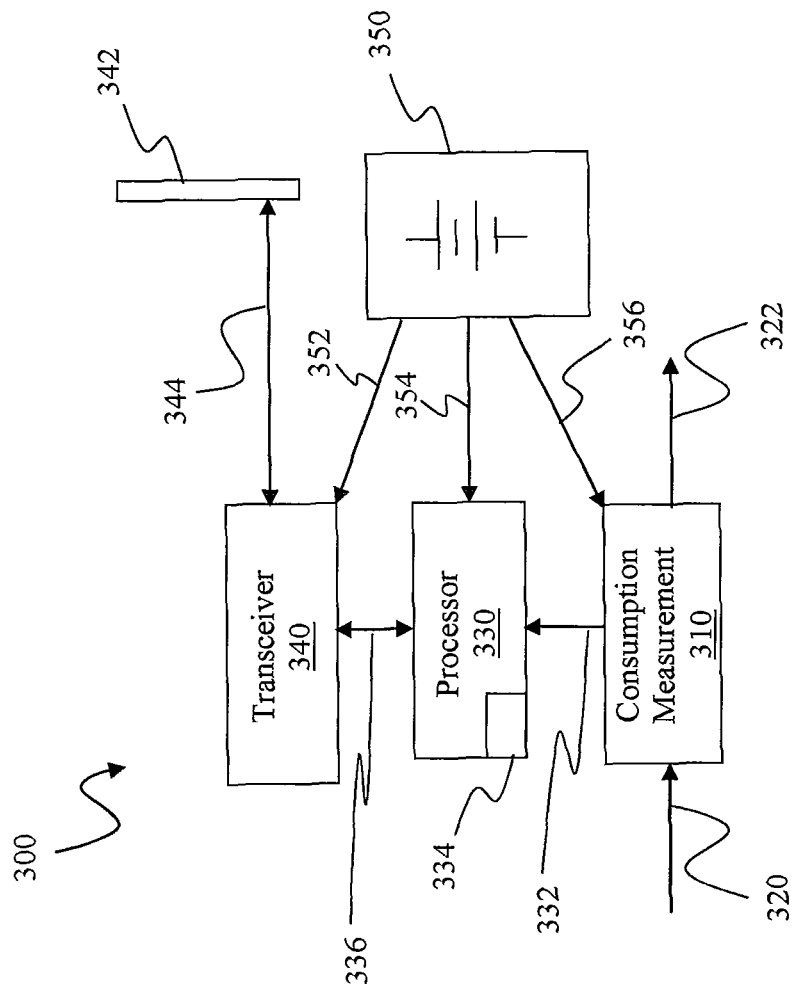
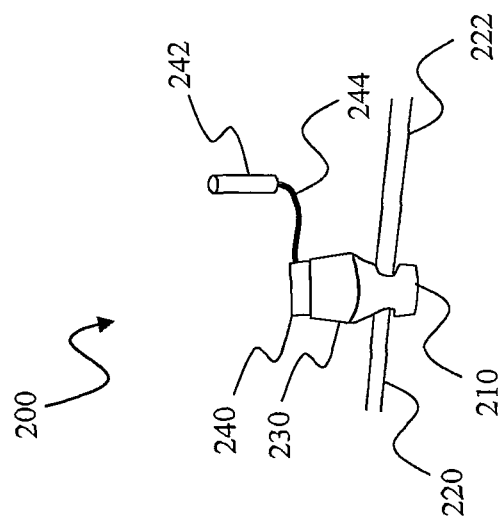

ENDPOINT REPEATER FUNCTIONALITY SELECTION

FIELD OF THE SUBJECT MATTER

The subject matter disclosed herein relates to battery operated devices. More specifically, the presently disclosed subject matter relates to methods and apparatus for implementing selective operation of battery operated utility endpoint devices as repeaters.

BACKGROUND OF THE SUBJECT MATTER

Utility metrology devices including electricity, water, gas, and oil meters generally are often respectively combined with or associated with an endpoint device. Such endpoint devices may provide various functionalities such as data collection and storage, service disconnection capabilities, and various communications capabilities including radio frequency (RF) transmission and/or reception capabilities. Such RF capabilities may be employed for communications with a central facility for data upload purposes, that is, for reporting of utility consumption information, as well as data reception purposes for updating operating systems or parameters associated with endpoint operation including data collection associated parameters.

In many instances, endpoint devices and their associated utility consumption measurement associated devices are organized into a network configuration. Mesh type networks are a known example of an arrangement for some of such networks. In such an exemplary network configuration, information may be transmitted from one device to another as such information is directed generally to or from an individual endpoint device in relation to a central facility. In some instances, individual endpoints may be configured to operate as a repeater to convey information (such as data) to and/or from another endpoint that may not be able to directly communicate with the central facility or other central collection device, or which endpoint for any other reason is otherwise operated so as to not communicate directly with the central facility or other central collection device.

Certain operational issues may arise based on the different types of endpoint in consideration of the types of power supplies available to the endpoint. In some instances, electricity meters may draw power from the same power lines being monitored for power consumption. In such instances, power is available except during power outages. Other utility consumption meter and endpoint combinations, however, may only have battery power available for their operation during normally expected operating conditions. In some instances, water, gas, and oil meters are more likely than electricity meters to be operated from battery power during their so-called "normal" operation.

Further complicating RF communications in some environments is the common practice of installing endpoints in wells or pits, in other words, underground. Such installations tend to inherently reduce the range achievable between associated communicating devices, whether transmitter, receiver, or transceiver. In currently known efforts to address such limitations on transmission range, various repeater and antenna configurations have been previously provided. In some instances, one below ground endpoint may function as a repeater to relay information from another such below ground endpoint that may be "out of range" of an area collector, concentrator device, or a central facility. In addition, or in the alternative, above ground antennae have been previously provided to improve communications capabilities for underground installations.

While various implementations of endpoint operating systems and methodologies have been developed, no design has emerged that generally encompasses all of the desired power advantages as hereafter presented in accordance with the presently disclosed technology.

SUMMARY OF THE SUBJECT MATTER

In view of the recognized features encountered in the prior art and addressed by the presently disclosed subject matter, methodology for improving communications among battery operated network endpoints and a central facility has been provided. According to some embodiments of such methodology, a network of endpoint devices may be established wherein at least some of such endpoints are configured to operate as repeaters. Such endpoints having battery capacity sufficient to support repeating messages, transmit a signal to other endpoints to indicate that capacity. Using such methodology, messages may be relayed from endpoints not otherwise able to be heard at the central facility.

One issue arising from the use of below ground endpoints operating as repeaters, especially when such endpoints draw their operating power from battery power supplies, is the additional drain imposed on the limited power resources provided from the battery. It would be advantageous, therefore, to provide a mechanism where additional drain on the endpoint battery supplies may be minimized to maximize battery life.

In certain embodiments, transmission of a signal indicating availability to repeat messages may be permitted based on the reliability of the endpoint's communication path to the central facility. In some presently disclosed exemplary embodiments, the transmitted signal may correspond to a discovery bit.

In other embodiments, the endpoint may be associated with a measurement device whereby the endpoint may transmit measurement data to the central facility. In selected embodiments, the measurement device may be a consumption measurement device and in some of such embodiments may correspond to one of a water, gas, and oil meter.

The presently disclosed subject matter in some embodiments also relates to a network including a central facility and a plurality of endpoints. In such exemplary embodiments, the endpoints are battery powered and have communications capability for communicating with a central facility. In some such embodiments, selected of the endpoints may be operated as repeaters which indicate such repeater functionality capability to other endpoints only after determining that they have sufficient battery capacity to support repeating messages from other endpoints. In other present embodiments, indication of repeater capability functionality is given based on the reliability of the endpoint's communication path to a central facility. In selected embodiments, endpoints operating as a repeater advise other endpoints of such functionality capability by transmitting what may be referred to as a discovery bit.

In particular embodiments, endpoints may be associated with measurement devices whereby the endpoint may transmit measurement data to a central facility. In selected such embodiments, the measurement device may comprise a consumption measurement device, which in some embodiments may correspond to or be associated with at least one of a water, gas, and oil meter.

Additional embodiments of the presently disclosed subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments and uses of the presently disclosed subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently disclosed embodiments, of the presently disclosed subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the presently disclosed subject matter, including the best mode thereof, directed to one of ordinary skill in the art, is set forth in the specification, which makes reference to the appended figures, in which:

FIG. 2 schematically illustrates an endpoint device and associated metrology components as may be employed with the presently disclosed subject matter;

FIG. 3 is a block diagram illustrating operational components of an exemplary endpoint and associated metrology components in accordance with the presently disclosed subject matter.

Figure 1:
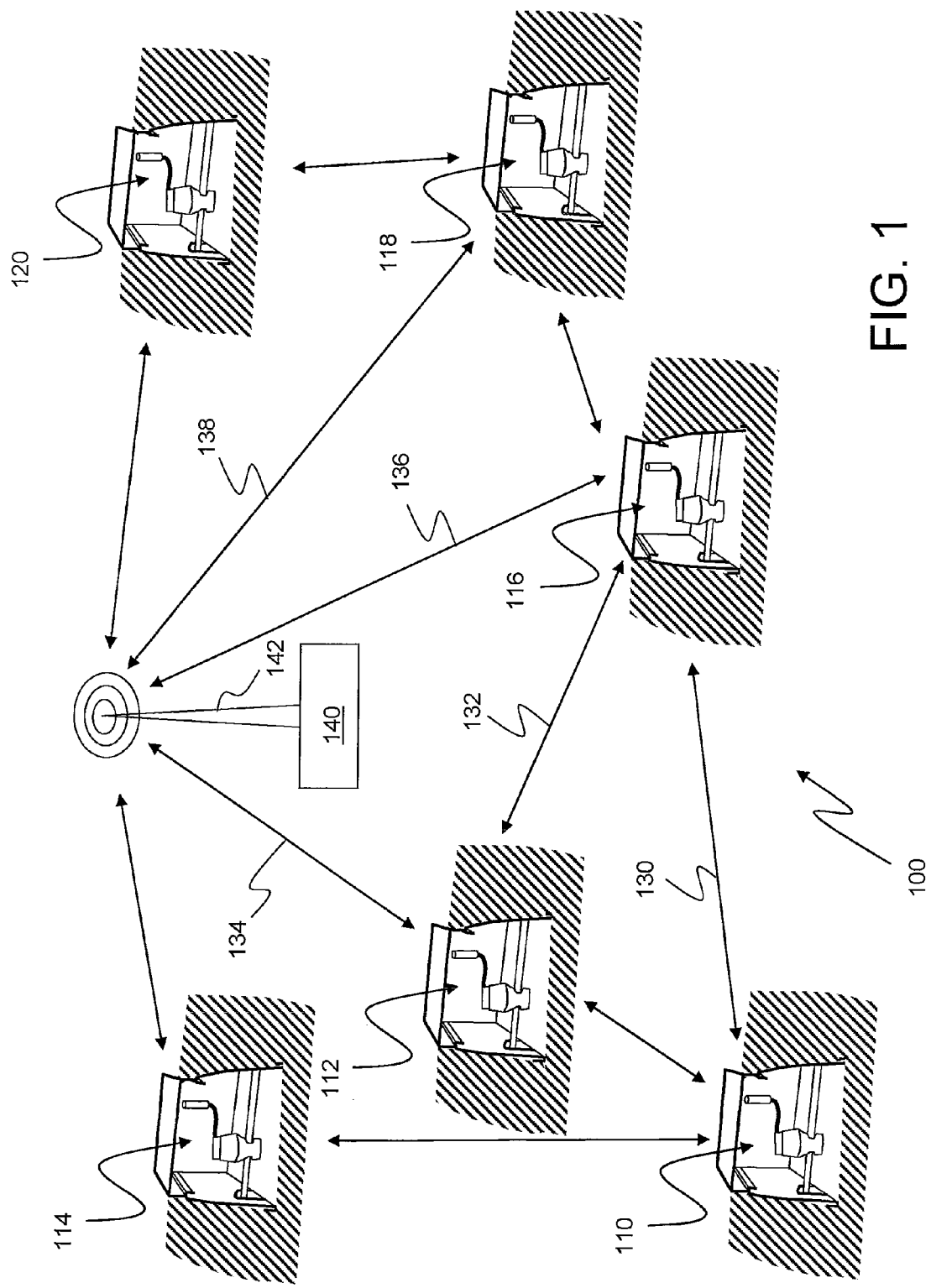
FIG. 1 illustrates an exemplary portion of an exemplary network employing a plurality of endpoint devices at least some of which are configured to function as repeaters in accordance with presently disclosed subject matter.

Repeat use of reference characters throughout the present specification and appended drawings is intended to represent same or analogous features, elements, or steps of the presently disclosed technology.

DETAILED DESCRIPTION OF THE SUBJECT MATTER

As discussed in the Summary section, the presently disclosed subject matter is particularly concerned with battery operated devices. More specifically, the presently disclosed subject matter relates to methods and apparatus for implementing selective operation of battery operated utility endpoint devices as repeaters.

Selected combinations of aspects of the disclosed technology correspond to a plurality of different embodiments of the presently disclosed subject matter. It should be noted that each of the exemplary embodiments presented and discussed herein should not insinuate limitations of the presently disclosed subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Reference is made hereafter in detail to the presently disclosed embodiments of the subject repeater functionality including battery operated endpoint configurations. Referring to the drawings, FIG. 1 illustrates an exemplary portion of an exemplary network generally 100 employing a plurality of exemplary/representative endpoints 110, 112, 114, 116, 118, 120 at least some of which are (or may be) configured to function as repeaters. In an exemplary configuration as illustrated in FIG. 1, each of the endpoints 110, 112, 114, 116, 118, 120 may be operated as a repeater so that, in the case of endpoint 112, such endpoint may function as a repeater for endpoints 110 and 116 as indicated by the double arrow lines between these endpoints. In other situations, an endpoint may be able to communicate directly with a central facility 140 as illustrated by double arrow lines 136, 138 between antenna 142 of central facility 140 and endpoints 116, 118, respectively. Additional details regarding certain uses of endpoints as repeaters is disclosed, for example, in U.S. Pat. No. 8,024,724, assigned to the assignee for the presently disclosed subject matter, and the complete disclosure of which is fully incorporated herein by reference, for all purposes.

In the following discussion, the term "endpoint" may be used as a singular designation to represent a combination of components including a component configured to communicate by way of radio frequency (RF) transmissions together with consumption measurement components. The RF communicating component may generally be referred to as a transceiver. Generally also such consumption measuring device may correspond to a water meter but could also include one or more measurement devices for the measurement of consumption or production of other commodities including without limitation, gas and oil. Further, the transceiver may be configured to provide communications between the endpoint and a central facility as well as between other endpoints. The term "endpoint" is intended to encompass variations of the foregoing as will be understood by those of ordinary skill in the art from the complete context hereof.

With continued reference to FIG. 1, it will be noticed that each of the endpoints 110, 112, 114, 116, 118, 120 is configured to communicate by RF transmissions as illustrated by representative double-headed arrow lines 130, 132, 134, 136, 138. In general, each of the endpoints 110, 112, 114, 116, 118, 120 may communicate with any other endpoint within its transmission range and may also communicate with a central facility 140 by way of its communications equipment represented generally by antenna 142. Antenna 142 may correspond to a relatively tall tower structure positioned to provide coverage for a large area covering, for example, up to 100,000 consumer locations. In some instances, multiple, additional local communications facilities similar in arrangement (not separately illustrated) to central facility 140 may be provided within, for example, specific areas or neighborhoods to relay information between endpoints and a single central facility. Such communications may be conducted by way of RF transmissions or other communication technologies including, such as, coaxial cable, optical cable, dedicated telephone lines, wireless cellular service, or any other suitable communications currently existing or pursuant to yet to be developed methodologies.

FIG. 2 shows that each of the endpoints 110, 112, 114, 116, 118, 120 illustrated in FIG. 1 may correspond to an endpoint 200 that includes multiple elements. In the particular instance that a given endpoint 200 corresponds to a water meter, such endpoint 200 may be housed in an enclosure that is at least partially under ground as more generally illustrated/represented in FIG. 1. With continued reference to FIG. 2, a water meter 210 having an input water line 220 and an output water line 222 may have associated therewith a controller 230 and a transceiver 240. Transceiver 240 may have coupled thereto an antenna 242 by way of a cable 244. Antenna 242 may be positioned within the underground enclosure along with the other endpoint components or may be positioned above ground (not specifically illustrated herein). The position of the antenna may be decided based on a number of considerations, such considerations and, in fact, the final selected location and/or type of the antenna, is not a specific limitation of the presently disclosed subject matter.

With reference to FIG. 3, there is illustrated a block diagram generally 300 illustrating operational components of an endpoint and associated metrology components in accordance with the presently disclosed subject matter. It will be noticed that identification numbers corresponding to components already described with reference to FIG. 2 bear the same reference number in FIG. 3 save for the 300 series designation.

Thus, as illustrated in FIG. 3, representative endpoint generally 300 includes a consumption measurement portion 310 with input and output portions 320, 322, respectively. As previously noted, such arrangement may be in some instances a water meter with input and output water lines. In alternate embodiments, those of ordinary skill in the art will appreciate that consumption measurement portion 310 and its associated input and output lines 320, 322 may also provide measurement and handling of liquid gas, oil, natural gas, and in some instances electricity. It should further be appreciated that the use of the word "consumption" herein may more generally be used to specify "flow" or delivery of a utility. Alternatively, the measurement may apply to an amount or rate of utility being produced by a source (e.g., an oil or gas well) and not just an amount being consumed in the sense of being "used" by a consumer.

With continued reference to FIG. 3, a signal may be generated by consumption measurement portion 310 and passed to a processor 330 by way of representative signal line 332. Controller 330 may correspond to a microprocessor, computer, or other device that receives and in some instances stores information from consumption measurement portion 310. Such information may be stored in an associated memory portion 334 that may correspond to a portion of controller 330 or may correspond to a separate memory device or combinations thereof. Memory portion 330 or a sub-portion thereof, may also be used to store operational instructions relating to the operation of the consumption measurement portion 310, the controller 330, and/or transceiver 340. For example, instructions stored in controller 330 may relate to times and types of data collection, billing and/or rate information, and/or information related to the operation of transceiver 340.

Transceiver 340 may receive instructions by way of communications line 336 and may also forward information by the same communications line 336 or an alternate line communication to controller 330 as may be received from, for example, a central network facility. Transceiver 340 may transmit and/or receive RF communications signals by way of antenna 342 and cable 344 coupling transceiver 340 with antenna 342.

Finally, it will be noticed that a battery operated power supply 350 has been provided that may supply operating power to one or more of the consumption measurement portion 310, controller 330, and transceiver 340. In accordance with the presently disclosed subject matter, care is taken to minimize consumption of battery supply 350. More particularly, care is taken, in particular in those instances where endpoint 300 operates as a repeater device, to avoid the use of a limited number, or just one, of such repeating endpoint device. In such manner, additional load requirements placed on endpoints 300 operating as repeaters may be shared among a larger number of such devices, to thereby share the additional burden among a number of endpoints.

In an exemplary configuration, if the overall system "load levels" for repeater usage per presently disclosed subject matter is based on, for example, among other considerations, remaining battery capacity, the repeater functionality can be shared among a relatively larger number of endpoints 300, thus requiring only minimum increase in the battery capacity in each of the overall fleet of endpoints 300. Since battery cost is one of the most significant costs of each endpoint, the system costs can be minimized as the workload is spread over more repeaters.

In addition, the endpoints that are selected as the group of endpoints that will share the repeater load also will be those found to have a very reliable communications path. With higher reliability communications paths, endpoints in general and more particularly also those endpoints operating as repeaters can reduce the frequency of their transmitted messages so as to minimize battery usage as well. Such reduction in traffic also reduces RF collisions, thus improving reliability of communications and contributes to overall system performance as well as extended battery usage.

In an exemplary embodiment, an endpoint 300 having battery capacity above a predetermined level and having a sufficient quality of service connection to at least another upstream endpoint or directly to a central facility may make such facts known to surrounding endpoints. As is known to those of ordinary skill in the art, endpoints operating in network environments generally transmit a header associated with substantially all transmitted signals. Such headers include not only identification information and at least some routing information such as a next-hop address, but also discovery information. In accordance with the presently disclosed subject matter, endpoints may transmit a signal including the endpoint's discovery bit as an indicator to other endpoints that it is willing to accept and forward messages provided such endpoint has enough battery capacity to offer such repeater functionality service to surrounding other endpoints. In such manner, the selection of an endpoint as a repeater for other endpoints can be based on proximity to an unheard endpoint, as well as battery availability of the selected repeater endpoint.

Additional benefits are also derived by such operation as inherently endpoints operating as repeaters will have very reliable communications paths and can thus reduce the frequency of their communications which can have a significant impact on the overall system performance and battery usage.

Figure 4:
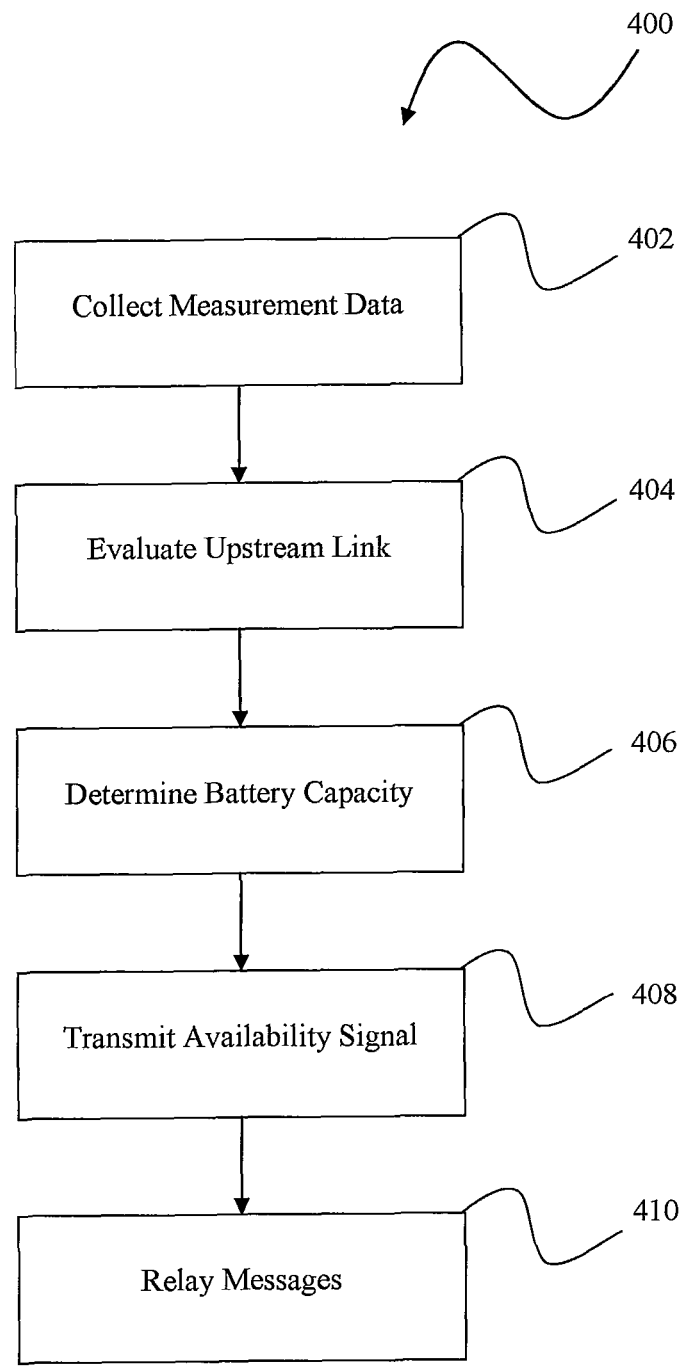
FIG. 4 is a flow chart illustrating an exemplary method of operation in accordance with the presently disclosed subject matter.

With reference to FIG. 4, there is illustrated a flow chart 400 of an exemplary method of operation in accordance with the presently disclosed subject matter. Generally, at least selected endpoints are associated with a measurement device, as previously described. Thus, at step 402 such endpoints may collect measurement data for later transmission.

In accordance with the presently disclosed subject matter, selected of the endpoints, including those capable of operation as a repeater, may evaluate their upstream links at step 404 to assess their own ability to communicate in a reliable manner.

Endpoints may also evaluate at step 406 their respective battery capacity to determine whether there is sufficient capacity for the additional operation of the endpoint as a repeater for data from other endpoints. In the illustrated exemplary embodiment, if sufficient battery capacity is available and if the endpoint has sufficiently reliable uplink capability, endpoints capable of operating as a repeater may then transmit a signal at step 408 to indicate such capability to other endpoints. In preferred embodiments, the signal transmitted in step 408 includes a discovery bit.

If endpoints receiving such transmitted signal of indication of repeater capability determined that they are in need of such signal repeating, the offering endpoint may then relay messages at step 410 for those endpoints requiring such services.

Sufficiency of battery capacity may be decided in some instances based on determination of battery capacity above a predetermined level while individual upstream communications reliability may be determined in some instances based on a number of different criteria including, without limitation, quality of service evaluation, number of hops to the central facility, and level of traffic already being repeated by the endpoint.

While the presently disclosed subject matter has been described in detail with respect to specific embodiments thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations, and/or additions to the presently disclosed subject matter as would be readily apparent to one of ordinary skill in the art.

What is claimed is:

1. A method for improving communications among battery operated network endpoints and a central facility, comprising:

evaluating, by a repeater endpoint a repeater availability, wherein the repeater availability comprising communication reliability and battery capacity of the repeater endpoint, wherein the communication reliability includes determining having a sufficient quality of service connection from the repeater endpoint to at least other endpoints or the central facility, and wherein the battery capacity of the repeater endpoint includes determining being above a predetermined level;

transmitting a signal from the repeater endpoint intended for the at least other endpoints, the repeater endpoint having water or gas metering functionality and belonging to a group of repeater endpoints configured to share a repeater load of messages from the at least other endpoints, wherein the at least other endpoints also having the water or gas metering functionality, wherein the signal is configured to indicate availability of repeater functionality at the repeater endpoint sufficient to support repeating the repeater load of messages from the at least other endpoints based on the evaluating of the repeater availability of the repeater endpoint, wherein the signal comprises a packet header having a discovery bit, wherein the discovery bit indicates to the at least other endpoints that the repeater endpoint has enough battery capacity to receive the repeater load of messages and to forward the repeater load of messages, and wherein the group of repeater endpoints are designated as repeater endpoints based at least in part on proximity to the at least other endpoints that are out-of-range of the central facility and based at least in part on battery capacity of the group of repeater endpoints being sufficient to repeat the repeater load of messages from the at least other endpoints;

receiving the repeater load of messages at the repeater endpoint from the at least other endpoints to which the signal was transmitted that requires the repeater functionality to be heard at the central facility; and relaying the received repeater load of messages from the at least other endpoints requiring the repeater functionality, wherein the relaying is performed by the group of repeater endpoints in a shared manner, wherein the shared manner distributes workload over at least two repeater endpoints of the group of repeater endpoints to prevent any single repeater endpoint from the group of repeater endpoints from performing the entire relaying required by the at least other endpoints that are out of range.

2. The method as in claim 1, wherein said transmitting the signal is based on reliability of a communication path from the repeater endpoint to the central facility.

3. The method as in claim 1, further comprising: transmitting measurement data to the central facility.

4. The method as in claim 3, wherein the measurement data is consumption measurement data.

5. The method as in claim 3, wherein the measurement data describes at least one of water, gas, or oil consumption.

6. A network, comprising:

a central facility; and a plurality of endpoints having water or gas metering functionality, selected of the plurality of endpoints being battery powered and having capability to operate as repeaters, wherein the selected endpoints are selected based at least in part on proximity to other endpoints that are out-of-range of the central facility and based at least in part on battery capacity of the selected endpoints being sufficient to repeat messages sent from the out-of-range endpoints;

wherein the selected endpoints share a repeater load and perform functions comprising:

evaluating, by the selected endpoints a repeater availability, wherein the repeater availability comprising communication reliability and the battery capacity of the selected endpoints, and wherein the communication reliability includes determining having a sufficient quality of service connection from the selected endpoints to the out-of-range endpoints or the central facility, and wherein the battery capacity of the selected endpoints includes determining being above a predetermined level;

transmitting signals from the selected endpoints intended for the out-of-range endpoints, the signals configured with preambles having a discovery bit to indicate to the out-of-range endpoints availability of repeater functionality thereat sufficient to support repeating the messages from the out-of-range endpoints based on the evaluating of the repeater availability of the selected endpoints;

receiving the messages at the selected endpoints from the out-of-range endpoints that require the repeater functionality to be heard at the central facility; and relaying the received messages, wherein the relaying is performed by the selected endpoints in a shared manner, wherein the shared manner distributes workload over at least two endpoints of the selected endpoints to prevent any single endpoint of the selected endpoints from performing the entire relaying required by the out-of-range endpoints.

7. The network as in claim 6, wherein the signals are provided based at least in part on reliability of a communication path to the central facility.

8. The network as in claim 6, wherein the selected endpoints are selected based at least in part on reliability of a communication path from a respective endpoint of the plurality of endpoints to the central facility.

9. The network as in claim 6, further comprising:
a measurement device associated with each of the plurality of endpoints.

10. The network as in claim 9, wherein said measurement device comprises a consumption measurement device.

11. The network as in claim 10, wherein the consumption measurement device comprises a water, gas, or oil meter.

12. A method, comprising:
collecting measurement data at an endpoint in a network of battery operated endpoints having water or gas metering functionality;
evaluating, by the endpoint a repeater availability, wherein the repeater availability comprising communication reliability and battery capacity of the endpoint, and wherein the communication reliability includes determining having a sufficient quality of service connection from the endpoint to other endpoints or a central facility, and wherein the battery capacity of the endpoint includes determining being above a predetermined level;
transmitting, from the endpoint and intended for the other endpoints in the network, the transmitting endpoint belonging to a group of endpoints selected to share a repeater load from the other endpoints, wherein the shared repeater load comprising packets with a preamble configured with a discovery bit to indicate to the other endpoints availability of repeater functionality usable by the other endpoints based on the evaluating of the repeater availability of the endpoint, wherein the group of selected endpoints are selected based at least in part on proximity to the other endpoints that are out-of-range of the central facility and based at least in part on battery capacity of the group of selected endpoints being sufficient to repeat messages from the other endpoints;
receiving the messages at the endpoint from the other endpoints at which the discovery bit was received that is out-of-range of the central facility and that requires the repeater functionality to be heard at the central facility; and
relaying the received messages from the other endpoints, wherein the relaying is performed by the selected group of endpoints in a shared manner, wherein the shared manner distributes workload over at least two endpoints of the selected group of endpoints to prevent any single endpoint from of the selected group of endpoints from performing the entire relaying required by the other endpoints that are out of range.

13. The method as in claim 12, wherein the evaluating comprises evaluating links of the endpoint in the network to the other endpoints upstream in the network.

14. The method as in claim 12, wherein:
the evaluating includes evaluating upstream links of the endpoint in the network and determining if the battery capacity of the endpoint in the network is sufficient to share the repeater load.

15. The method as in claim 12, wherein the discovery bit indicates availability of sufficient battery power to perform the relaying and availability of a reliable communication path to perform the relaying.

* * * * *